United States Patent Office 2,824,828
Patented Feb. 25, 1958

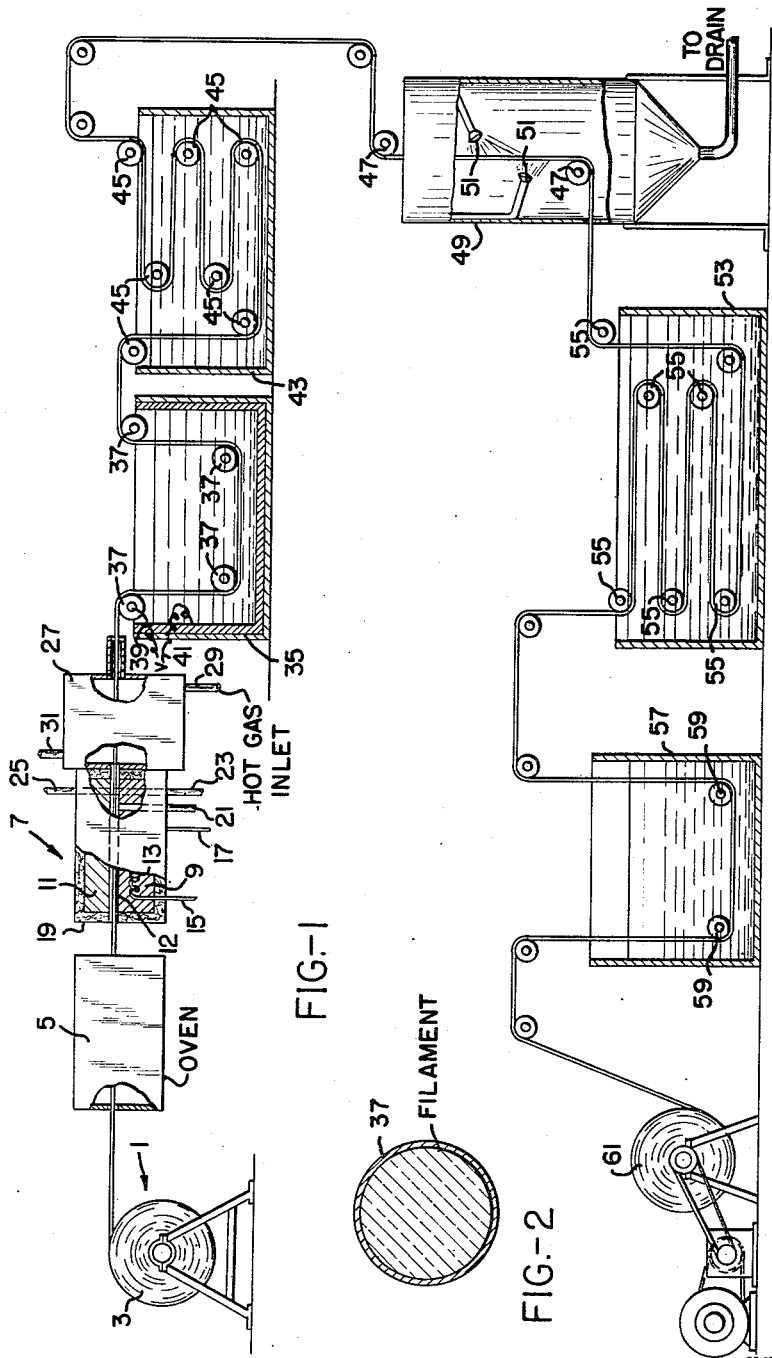

2,824,828

COLORED GLASS FIBERS AND METHOD OF PRODUCING THE SAME

Howard J. Homer and John R. Whitacre, Dayton, Ohio, assignors to The Commonwealth Engineering Company of Ohio, Dayton, Ohio, a corporation of Ohio Application May 12, 1955, Serial No. 507,828

3 Claims. (Cl. 204—20)

This invention relates to glass fiber products and materials and is particularly concerned with colored glass fibers and methods of producing the same.

A primary object of the invention is to provide on glass fibers a surface which is receptive to coloring agents and which cooperates with ordinary coloring agents, such as dyes and pigments, to permanently color the fibers.

A further object of the invention is to produce colored glass fibers without sacrificing the desirable characteristics of the fibers and which colored glass fibers have improved abrasion resistance.

An important object of the invention is to provide novel methods for the production of colored glass fibers.

In the practice of the invention the glass fibers, provided in strand or fabric form, are coated thereover with a layer of aluminum metal which is then anodized to form aluminum oxide; the anodized coated fibers are then dyed and the product is sealed preferably by subjecting the dyed material to a hot aqueous treatment which converts the aluminum oxide to hydrated aluminum oxide. This conversion causes an increase in volume and a compacting of the material and effectively closes the pores and thus assists in dye retention and prevents further dyeing of the material.

Treatment to produce the aluminum coating on the glass fibers is carried out by heating the fibers to at least the thermal decomposition point of a heat decomposable aluminum bearing gaseous compound and contacting the heated fibers with such a gas. Aluminum tri-methyl, tri-ethyl or tri-propyl are very suitable and in general compounds of the formula $Al(R)_3$ wherein R represents any alkyl radical of low molecular weight, preferably below 6 carbon atoms, are useful; combinations of the aluminum alkyls such as $Al(R_1R_2R_3)$ may be utilized. If the pressure is maintained low during the deposition the aluminum aryls such as the phenyl or benzyl may be employed.

The treatment with the aluminum compound may be effected in conjunction with the formation of the fibers or subsequent to the formation of the fibers into products such as glass cloth. For appropriate adhesion of the aluminum to the fibers it is best to remove any lubricant or size by heat treatment or solvent washing prior to exposure to the gaseous atmosphere.

The aluminum coating is anodized in a suitable acid bath to produce a surface receptive to dyeing. Most suitably the anodizing solution is sulfuric acid although chromic acid may also be employed. The anodized fibers should be washed completely free of acid in order that the subsequent dyeing operation will not be impeded.

The dyeing, that is the coloring agent, may be selected from those customarily employed in the dyeing of textiles. Water solutions having a concentration of 0.2 to 0.6% by weight of the dye are very suitable. The dyes include malachite green, methyl violet, alizarine dyes, thioflavines and para red for example.

The sealing or closing of the pores of the dyed anodized material is most important and suitably effected with an aqueous medium at temperatures of 180 to 200° F. This sealing bath preferably contains an agent to inhibit leaching of the dye during sealing; a concentration of about 0.5% of nickel acetate is effective for this purpose.

The sealing operation causes the dyed anodized aluminum or aluminum oxide to be converted to an aluminum hydrate. The pick-up of the water results in a volume increase, pore closing being effected with the result that dye leaching is prevented and the material is no longer susceptible to dyeing.

The effectiveness of the procedure is considered attributable to the purity of the aluminum deposit obtained by plating the heat decomposable gaseous compound. Aluminum when alloyed with other metals does not respond as well to the dyeing procedure for the fibers.

The invention will be more fully understood by reference to the following detailed description and accompanying drawing wherein:

Figure 1 schematically illustrates apparatus useful in the practice of the invention; and Figure 2 is a cross-sectional view on an enlarged scale of a filament produced in accordance with the invention.

Referring to Fig. 1 the numeral 1 indicates a reel having thereon a bundle of glass fiber rovings 3. A roving consists of a large plurality of filaments which are parallel laid and are of a substantially continuous length; each filament may have a diameter of about 9 microns for example and the roving may contain 204 of these filaments, while a roving bundle may, as at 3, comprise suitably 8 rovings. Such rovings are commercial items.

The numeral 5 indicates an oven through which the roving bundle is passed; this oven is effective to remove lubricant from the fibers and normally operates at a temperature of between 300 and 600° F. With some binder-lubricants, particularly those containing starch, it may be preferable to remove the binder prior to initiating the process to avoid an unduly slow rate of roving speed; however in some instances the filaments may be formed without binder or lubricant application and the oven may then be dispensed with.

The numeral 7 indicates a heating chamber; this comprises a pair of rectangular blocks 9, 11 the lower one of which is slotted longitudinally over a central portion of the width to provide a passageway of somewhat greater thickness than the rovings. The base wall 12 of the passageway is smooth surfaced to permit the rovings to slide thereover.

The numeral 13 indicates an electrical resistance heater element buried in the lower block 11 and which element has leads 15, 17 connected to a source of voltage. The blocks themselves are provided with a covering insulation shown at 19 and hence the base wall 12 is heated and the roving filaments sliding thereover are similarly heated. In this embodiment the fibers are heated to approximately 525–550° F. Where the oven 5 is utilized and the oven is closely positioned to the chamber 7 the heat of the oven assists in attaining the required temperature which of course is below the softening point of the material.

A conduit 21 communicates from the exterior with the passageway and a heavy flow of inert gas such as nitrogen, or carbon dioxide, is passed through the conduit to the passageway and flows leftwardly (Fig. 1) to seal the interior of the passageway from the atmosphere. Accordingly the inert gas flow is preferably at least slightly above atmospheric pressure. Such gas flow countercurrent to the roving bundle moving through the slot tends to decrease the slight friction effects between the roving bundle and the base wall 12.

The right hand end of the heating chamber 7 is cooled over a short space to a temperature below that at which the gaseous aluminum bearing compound will decompose to deposit metal. This prevents deposition of metal at the chamber extremity. The cooling is effected by passing cooling water from inlet 23 to outlet 25 through conduit interconnected holes bored in the block ends.

The plating chamber 27 is directly secured to the heating chamber 7 and is an enlarged spacing through which the plating gas flows from inlet 29 toward outlet 31. As noted the end of heating chamber 7 which borders the plating chamber 27 is cooled and no deposition occurs in the heating chamber. In this connection it is to be noted that the gas pressure within the passageway of the heating chamber tends to prevent any plating gas flow into the passageway itself. Further the roving thickness is considerable and tends to block the passageway and the roving movement itself assists to prevent plating gas flow into the heating chamber.

The plating gas of the present embodiment may be aluminum tri-methyl and the vapors entering the plating chamber 27 through inlet 29 are suitably at a temperature of 325–350° F. When this gas strikes the filaments the gas decomposes depositing metal on the filaments, the organic gaseous fragments being drawn out through outlet 31. The plating gas itself is preferably at substantially atmospheric pressure and the pressure and flow rate of the gas may be varied to attain a desired coating thickness on the roving filaments. Suitably at atmospheric pressure 4–6 cubic feet per minute of plating gas may be passed into the chamber when the roving bundle is moving at a lineal speed of 1 to 2 feet per minute. The pressure, flow rate and speed may be varied however in accordance with specific operating conditions.

The roving bundle as it passes from the heating chamber into the plating chamber tends to separate itself into individual filaments and the result is the production of a uniform coating of aluminum over each of the plurality of filaments. The coating of metal serves as a lubricant between filaments in the subsequent processing, the tendency of glass to cut glass in the fibers being substantially eliminated.

The heating and the aluminum coating do not noticeably alter the flexibility of the fibers and the roving bundle in compact relation passes through outlet opening 33 to anodizing bath 35.

Referring briefly to Fig. 2 the individual filament of the roving bundle as it passes to the anodizing bath has preferably a very thin coating of aluminum—approaching the monomolecular; the coating is indicated by the numeral 37 in Fig. 2.

The tank 35 is lead lined on the interior and the lining functions as a cathode in the anodizing process which takes place in tank 35. Suitably mounted in the tank are a plurality of metal pulleys 37 over which the aluminized filaments pass. Suitably connected between the interior of the tank and pulley 37 by lead wires 39, 41 is a source of voltage indicated by the letter V, the pulley 37 being connected to the positive pole of the directed current source.

Most suitably the tank 35 contains sulphuric acid at a temperature of 60°–80° F. and the concentration of sulphuric acid is preferably about 15–20% by weight. The current density may be suitably varied between 10–25 amp. per square foot. The time of treatment in the present instance with the above noted conditions may be approximately twelve minutes.

The anodizing treatment converts the aluminum coating to aluminum oxide and this forms a receptive surface for the subsequent dyeing operation.

It is to be particularly noted that the aluminum as it passes into the tank 35 is in a very pure state since it has been deposited from the gaseous aluminum bearing compound. The pure state of the material is most important to the realization of optimum conditions of dyeing as well as for anodizing. The brightest and clearest anodic film is obtained when the aluminum is pure whereas alloyed deposits containing even high percentages of aluminum do not approach the result of that attained by pure metal.

From tank 35 the anodized material passes to a wash tank 43 which contains cool water and which tank has suitably mounted therein pulleys 45 for the passage of the aluminized roving bundle. It is essential that the acid be completely removed prior to dyeing and accordingly the filamentary bundle is wound a series of times through the tank and the water of such tank should be changed frequently or may as desired be circulated.

The washing is completed most suitably by passing the bundle over pulleys 47 in tower 49, spray heads 51 thoroughly washing the last vestiges of acid from the roving bundle. The completely washed bundle passes to tank 53 which contains a dye solution, for example, a 0.2 to 0.6% by weight of methylene blue. The solution of the bath is held at a temperature of 150° F. and the bundle is passed over pulleys 55 in a serpentine path to insure the completion of the dyeing operation. Customarily an exposure time of sixty minutes is satisfactory to effect dyeing. The dyed material then passes to a bath 57 which contains water preferably having a concentration of nickel acetate to the extent of about 0.5% by weight. The temperature of this water is maintained at about 180°–200° F. and the effect of this treatment is to cause the aluminum oxide to be converted to an aluminum hydrate. Thus any porosity present in the anodized film will be sealed by the treatment in tank 57 as the materials pass over pulleys 59 and the dye in the pores will be closed in preventing leaching of the dye and also inhibiting further dyeing of the material. The roving strand is then wound up on a reel 61 and is ready for formation into finished articles including laminated materials; for example, transparent plastics may be laminated with the dyed glass fibers to produce novel visual effects.

It is to be noted that the speed of operation is reduced somewhat by the necessity for the long anodizing and dyeing times. The operation may of course be performed batch-wise and need not be a continuous process as shown in Fig. 1. On a continuous basis the speed depends upon the length and arrangement of the tanks 35, 43, 53 and 57. Under the circumstances described above wherein the speed of the roving strand is about one foot per minute, the length of the tank may be materially reduced by winding the filaments through in serpentine fashion. With considerable compaction of the pulley arrangement the speed of operation may readily be 8 to 10 feet per minute or higher as desired.

It will be understood that this invention is susceptible to modification in order to adopt it to different usages and conditions and accordingly, it is desired to comprehend such modifications within this invention as may fall within the scope of the appended claims.

We claim:

1. The method of coloring glass fibers which consists in contacting heated glass fiber surfaces at atmospheric pressure with a heat decomposable organic salt having the formula $Al(R)_3$ wherein R is a radical selected from the group consisting of methyl, ethyl and propyl to deposit a coating of aluminum on the fiber surfaces, anodizing the coating to form aluminum oxide, dyeing the anodized coating, and then subjecting the dyed coating to a hot aqueous treatment to hydrate the aluminum oxide, all while maintaining the fibers flexible.

2. The method of coloring glass fibers which consists in contacting heated glass fiber surfaces under vacuum conditions with a heat decomposable organic salt having the general formula $Al(R)_3$ wherein R is a radical selected from the group of benzyl and phenyl to deposit a coating of aluminum on the fiber surfaces, anodizing the coating to form aluminum oxide, dyeing the anodized coating, and then subjecting the dyed coating to a hot aqueous treatment to hydrate the aluminum oxide, all while maintaining the fibers flexible.

3. The method of coloring glass fibers which comprises contacting heated glass fiber surfaces at a vacuum to an atmospheric pressure with a heat decomposable organic salt of aluminum having the general formula $Al(R)_3$ wherein R is a radical selected from the group of lower aliphatic and aryl radicals to deposit a coating of aluminum on the fiber surfaces, anodizing the coating to form aluminum oxide, dyeing the anodized coating, and then subjecting the dyed coating to a hot aqueous treatment to hydrate the aluminum oxide, all while maintaining the fibers flexible.

References Cited in the file of this patent

UNITED STATES PATENTS

| | | |
|---|---|---|
| 2,132,613 | Francon | Oct. 11, 1938 |
| 2,186,721 | Guild | Jan. 9, 1940 |
| 2,536,818 | Lawton | Jan. 2, 1951 |
| 2,616,165 | Brennen | Nov. 4, 1952 |
| 2,619,433 | Davis et al. | Nov. 25, 1952 |
| 2,622,041 | Godley | Dec. 16, 1952 |
| 2,683,113 | Prance et al. | July 6, 1954 |
| 2,699,415 | Nachtman | Jan. 11, 1955 |
| 2,711,973 | Wainer et al. | June 28, 1955 |
| 2,743,700 | Toulmin | May 1, 1956 |